United States Patent [19]

Kakigi et al.

[11] Patent Number: 5,301,228
[45] Date of Patent: Apr. 5, 1994

[54] COMMUNICATION DEVICE WITH A DETACHABLE RECORDING MEDIUM

[75] Inventors: Yoshihiro Kakigi; Masaharu Washizaki; Takashi Takenaka, all of Higashihiroshima, Japan

[73] Assignee: Sharp Kabushiki Kaisha, Osaka, Japan

[21] Appl. No.: 834,159

[22] Filed: Feb. 12, 1992

[30] Foreign Application Priority Data

Feb. 18, 1991 [JP] Japan ................................ 3-46197
May 31, 1991 [JP] Japan ................................ 3-129569

[51] Int. Cl.⁵ ............................................. H04M 11/00
[52] U.S. Cl. ..................................... 379/100; 379/68; 379/73
[58] Field of Search ................. 379/82, 68, 356, 76, 379/73, 100, 53, 97, 98, 96, 94, 93

[56] References Cited

U.S. PATENT DOCUMENTS

| | | | |
|---|---|---|---|
| 3,914,539 | 10/1975 | Hashimoto | 370/82 |
| 4,469,919 | 9/1984 | Nakamura et al. | 379/73 |
| 4,891,835 | 1/1990 | Leung et al. | 379/88 |
| 4,922,524 | 5/1990 | Baba et al. | |
| 4,959,852 | 9/1990 | Kern et al. | 379/88 |
| 4,989,238 | 1/1991 | Iggulden et al. | 379/96 |
| 5,014,296 | 5/1991 | Saigano | |

FOREIGN PATENT DOCUMENTS

| | | |
|---|---|---|
| 0424880A2 | 10/1990 | European Pat. Off. . |
| 3913478A1 | 11/1989 | Fed. Rep. of Germany . |
| 0030352 | 2/1984 | Japan .................... 379/100 |
| 2-39671 | 1/1990 | Japan . |
| 2218297A | 11/1989 | United Kingdom . |

*Primary Examiner*—Curtis Kuntz
*Assistant Examiner*—Stellla L. Woo

[57] ABSTRACT

A transmission device using a telephone is provided. In a facsimile apparatus incorporating a telephone answering machine, a message or facsimile data is recorded on a magnetic tape, followed by index information concerning the recorded message or facsimile data. The index information includes the number of messages or facsimile data recorded on the magnetic tape and the record position of each data. The index information on magnetic tape is updated every time a new message or facsimile data is recorded on the tape. Even if a magnetic tape having data recorded is unloaded from the device and then loaded again, the facsimile apparatus can be restored to the state just before the magnetic tape was unloaded. Thus, head position detection and reproduction of the magnetic tape can be carried out promptly.

15 Claims, 8 Drawing Sheets

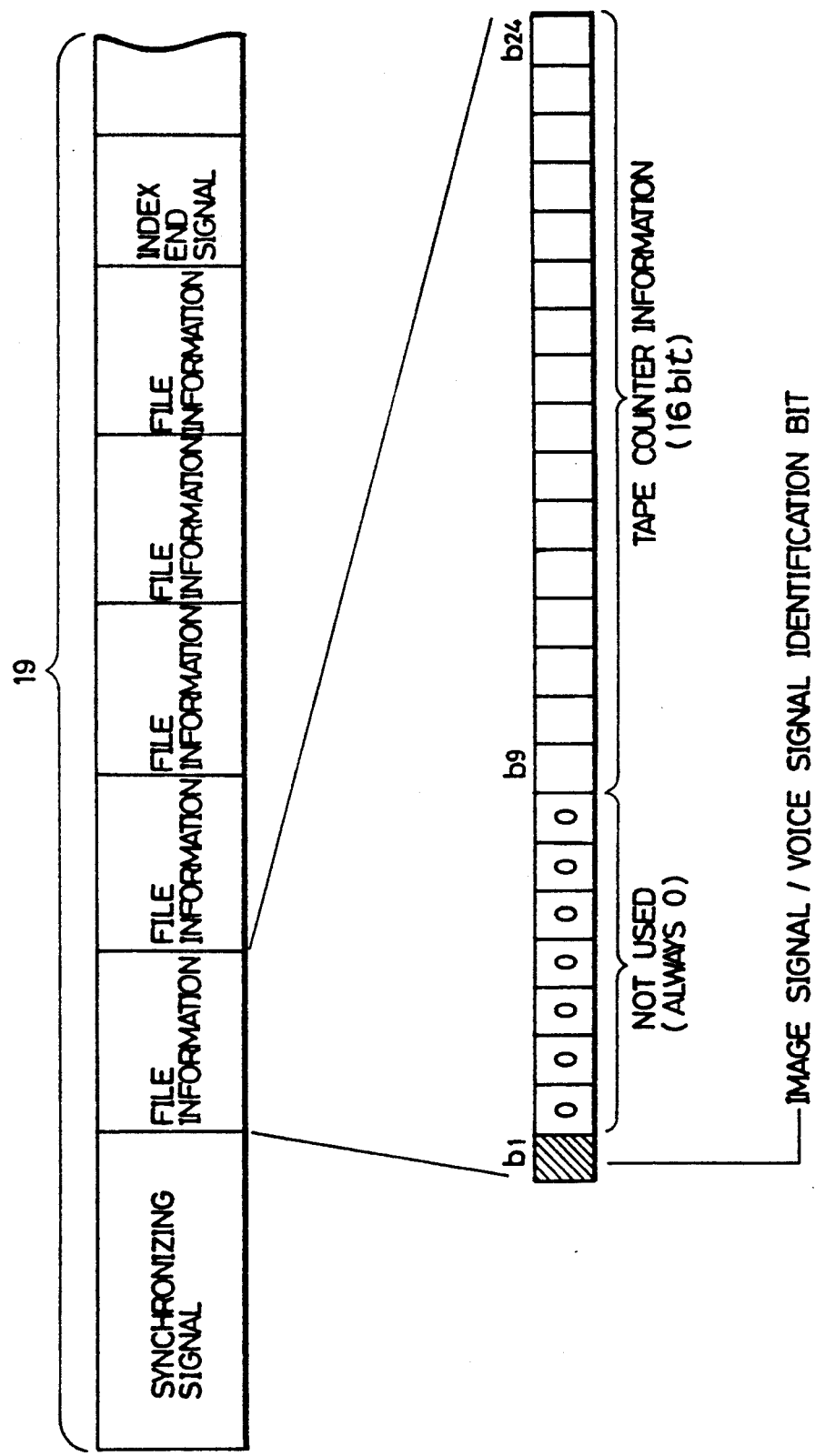

COMMUNICATION DEVICE WITH A DETACHABLE RECORDING MEDIUM

BACKGROUND OF THE INVENTION

1. Field of the Invention

The present invention relates to communication devices using telephone lines, and more particularly, to a communication device using a telephone line such as a facsimile apparatus with an answering machine for a telephone that records on a magnetic tape the received information such as a message (voice signal) and facsimile data (image signal).

2. Description of the Related Art

A conventional facsimile apparatus incorporating a telephone answering machine automatically responds to a call on receiving a predetermined number of ringing bursts announcing an incoming call. A message (voice signal) or facsimile data (image signal) sent from the caller is recorded on a magnetic tape. Information regarding the received transmission, such as the order of the recorded transmission on the tape, the position where that transmission is recorded on the magnetic tape (for example, a count value of the tape), the current number of messages and facsimile data recorded on the tape, are simultaneously stored in, for example, a random access memory (RAM).

The message and facsimile data recorded on a magnetic tape is reproduced by operating an operation panel provided in the device, or by a remote telephone set through an external telephone line operated by an operator far away from the local device (remote control unit). A specific message or facsimile data can be retrieved and reproduced if a number of the order of the received transmission is specified. In reproducing a message or facsimile data, a particular position on the tape can be specified, such as skipping one succeeding message or a facsimile data, or returning to the head position of the currently reproduced message or facsimile data. Such a head position detecting operation is carried out using the count value stored in the aforementioned RAM.

The currently recorded number of messages and facsimile data on the magnetic tape is indicated by means of a LCD (Liquid Crystal Display) on an operation panel or a blinking LED (Light Emitted Diode).

In the above-described facsimile apparatus incorporating a telephone answering machine, information regarding the transmitted data such as the count value stored in the RAM (referred to as index information hereinafter) was erased (cleared) when the magnetic tape having messages and facsimile data recorded was unloaded from the device. This is because no means are provided to detect whether a magnetic tape loaded in the device is the one unloaded from the device immediately before the loading. Index information in the RAM was erased when the magnetic tape was unloaded from the device to avoid erroneous operation of the next loaded magnetic tape from carrying out a head position detecting operation according to index information of the previous loaded tape.

Therefore, even if the same magnetic tape was loaded again into the device, head position detecting operation could not be carried out, and recording would be commenced from the head position of the magnetic tape. There was a possibility that important messages and facsimile data recorded may be erased. As a result, the availability of the communication device was degraded once the tape is unloaded from the device.

SUMMARY OF THE INVENTION

An object of the present invention is to allow the usage of a sequential recording medium containing arbitrary information in a communication device.

Another object of the present invention is to improve the usage efficiency of a recording medium in a communication device incorporating a recording medium that can record received data.

A further object of the present invention is to efficiently use a recording medium in a communication device that can record received information in a recording medium.

A still further object of the present invention is to restore a communication device that can record received data in a detachable magnetic tape, even if the magnetic tape is once ejected from the device, to the state prior to ejection.

Yet a further object of the invention is to enable the operator to know the contents of received data recorded on an arbitrary magnetic tape, in a communication device that can record received data on a detachable magnetic tape.

Yet another object of the present invention is to enable the operator to know the contents of data received by other communication device that can record received data on a detachable magnetic tape than the device which the operator is using.

Yet a still further object of the present invention is to prevent erroneous operation in a communication device that can record received data on a detachable magnetic tape, caused by ejection of the magnetic tape.

Still another object of the present invention is to use a detachable recording medium containing arbitrary information in a control method of a communication device having a recording medium that records sequentially received information.

The above objects of the present invention are achieved with a communication device including the following elements. A communication device according to the present invention that can receive a voice signal and an image signal via a telephone line includes a detachable recording medium that records a signal sequentially. The communication device includes a recorder device for recording a received voice signal/image signal into the recording medium, a device for reproducing sequentially the recorded voice signal/image signal, and a device for recording on the recording medium index information containing the information of distinction between a voice signal/image signal, and a recorded position on the recording medium.

According to the communication device of the present invention, not only voice signal/image signal, but also index information including the recorded position thereof on a recording medium is recorded in the recording medium that records data in sequence. The index information is stored into the memory of the device when the medium is loaded therein. As a result, the usage is possible of a sequential recording medium including arbitrary information in a communication device.

According to another aspect of the present invention, a communication device control method in a communication device that can receive a voice signal and an image signal via a telephone line includes the steps of: receiving a voice signal/image signal; recording the received voice signal/image signal sequentially in a recording medium; and recording on the recording medium index information containing the type and recorded position of the received voice signal/image signal. The control method of the communication device according to the present invention includes the above-steps, whereby the index information of the type and recorded position of each information stored in the communication device is recorded on the recording medium. Thus, the usage of a recording medium including arbitrary information is possible in the control method of the communication device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing in details the recording format of the magnetic tape of FIG. 4.

DESCRIPTION OF THE PREFERRED EMBODIMENTS

(1) First Embodiment

Figure 1:
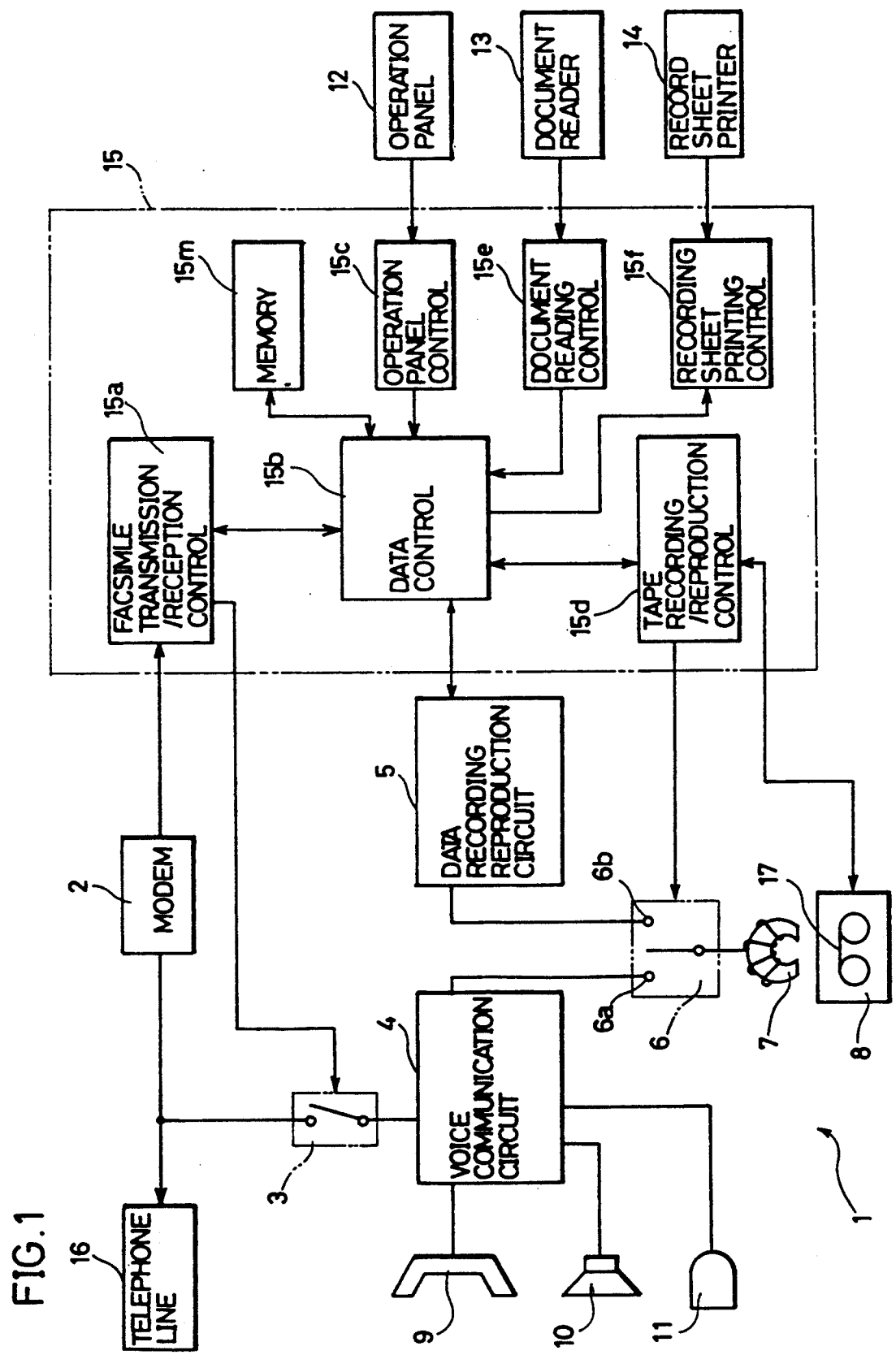
FIG. 1 is a block diagram showing the structure of a facsimile apparatus 1 according to an embodiment of the present invention.

FIG. 1 is a block diagram of a facsimile apparatus incorporating a telephone answering machine (referred to simply as facsimile apparatus hereinafter) 1 according to an embodiment of the present invention. Facsimile apparatus 1 is connected to a telephone line 16 to carry out transmission/reception of an image signal (also referred to as facsimile data) and a voice signal (also referred to as a message) via telephone line 16.

A modem 2 and a hook switch 3 are connected to telephone line 16. Modem 2 modulates and demodulates an image signal for carrying out facsimile transmission. Hook switch 3 has its open/close controlled by a main control unit 15 that will be described later, and is connected to a voice communication circuit 4 for carrying out voice communication with a caller by a telephone set.

A handset 9, a speaker 10, and a microphone 11 are connected to voice communication circuit 4. Voice communication is possible through handset 9, or through speaker 10 and microphone 11. A magnetic head 7 is connected to voice communication circuit 4 via a switch 6. This allows the recording of a voice signal provided from voice communication circuit 4 to magnetic tape 17, and also, the reproduction of a voice signal recorded in magnetic tape 17 to be audible through handset 9 or speaker 10. Magnetic tape 17 is driven by a magnetic tape driving mechanism 8.

In addition to voice communication circuit 4, a data recording/reproduction circuit 5 is connected to switch 6. Data recording/reproduction circuit 5 records an image signal (digital data) applied from a main control unit 15, index information (digital data) or a CUE signal (a rectangular wave signal of 50 Hz for fast forwarding) that will be described later, and reproduces these digital data and CUE signal from magnetic tape 17.

An operation panel 12 for operating facsimile apparatus 1, a document reader 13 formed of an image sensor for reading optically an original document to be transferred and for converting the same into an electric signal (facsimile data), and a printer 14 formed of a thermal head for printing the received facsimile data onto a record sheet are connected to main control unit 15.

Main control unit 15 comprises a facsimile transmission/reception controller 15a, a data controller 15b, an operation panel controller 15c, a tape recording/reproduction controller 15d, a document reading controller 15e, a record sheet printing controller 15f, and a memory 15m.

Facsimile transmission/reception controller 15a carries out the process according to the transmission protocol for facsimile transmission to transmit/receive facsimile data. Data controller 15b controls the procedure of facsimile data such as: transmitting facsimile data from facsimile transmission/reception controller 15a to data recording/reproduction circuit 5 and record sheet printing controller 15f according to a signal from operation panel controller 15c; transmitting facsimile data from document reading controller 15e to facsimile transmission/reception controller 15a, data recording/reproduction circuit 5, or to record sheet printing controller 15f; and transmitting facsimile data from data recording/reproduction circuit 5 to facsimile transmission/reception controller 15a and to record sheet printing controller 15f.

Operation panel controller 15c monitors the state of operation panel 12 to supply a signal to data controller 15b when operation panel 12 is operated. Data recording/reproduction controller 15d controls the operation of magnetic tape driving mechanism 8 or switch 6 according to a signal from data controller 15b.

Document reading controller 15e controls the operation of document reader 13 to provide the readout facsimile data to data controller 15b. Record sheet printing controller 15f controls the operation of printer 14 to print onto a record sheet the facsimile data provided from data controller 15b. Memory 15m stores index information indicating the information recorded on magnetic tape 17. Memory 15m can also store facsimile data provided from document reader 13, or facsimile data reproduced from magnetic tape 17. Thus, various facsimile transmission such as relay transmission, timed transmission, and broadcast of facsimile data can be realized.

Figure 2:
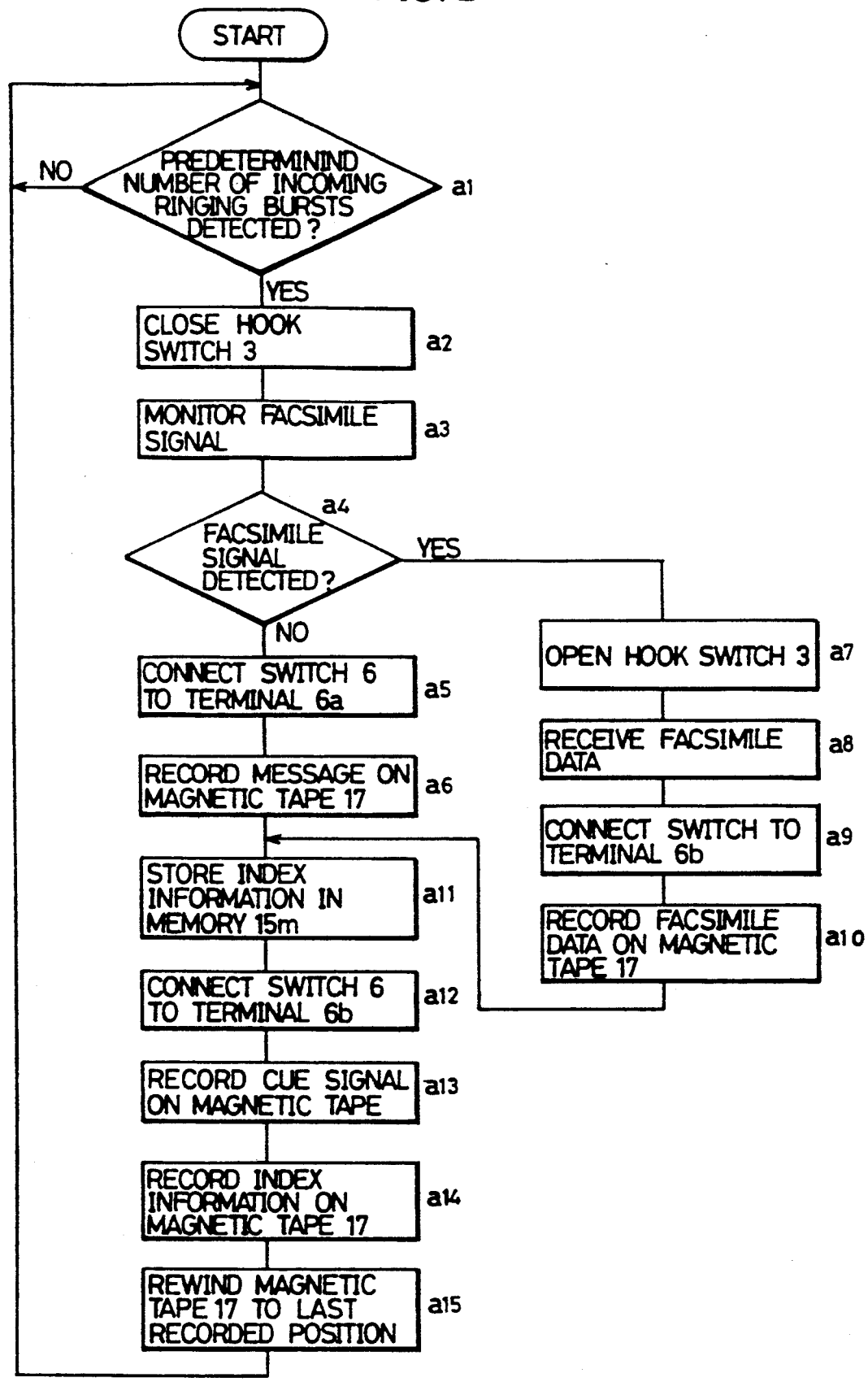
FIG. 2 is a flow chart for describing the operation of facsimile apparatus 1 at the time of automatic response.
Figure 3:
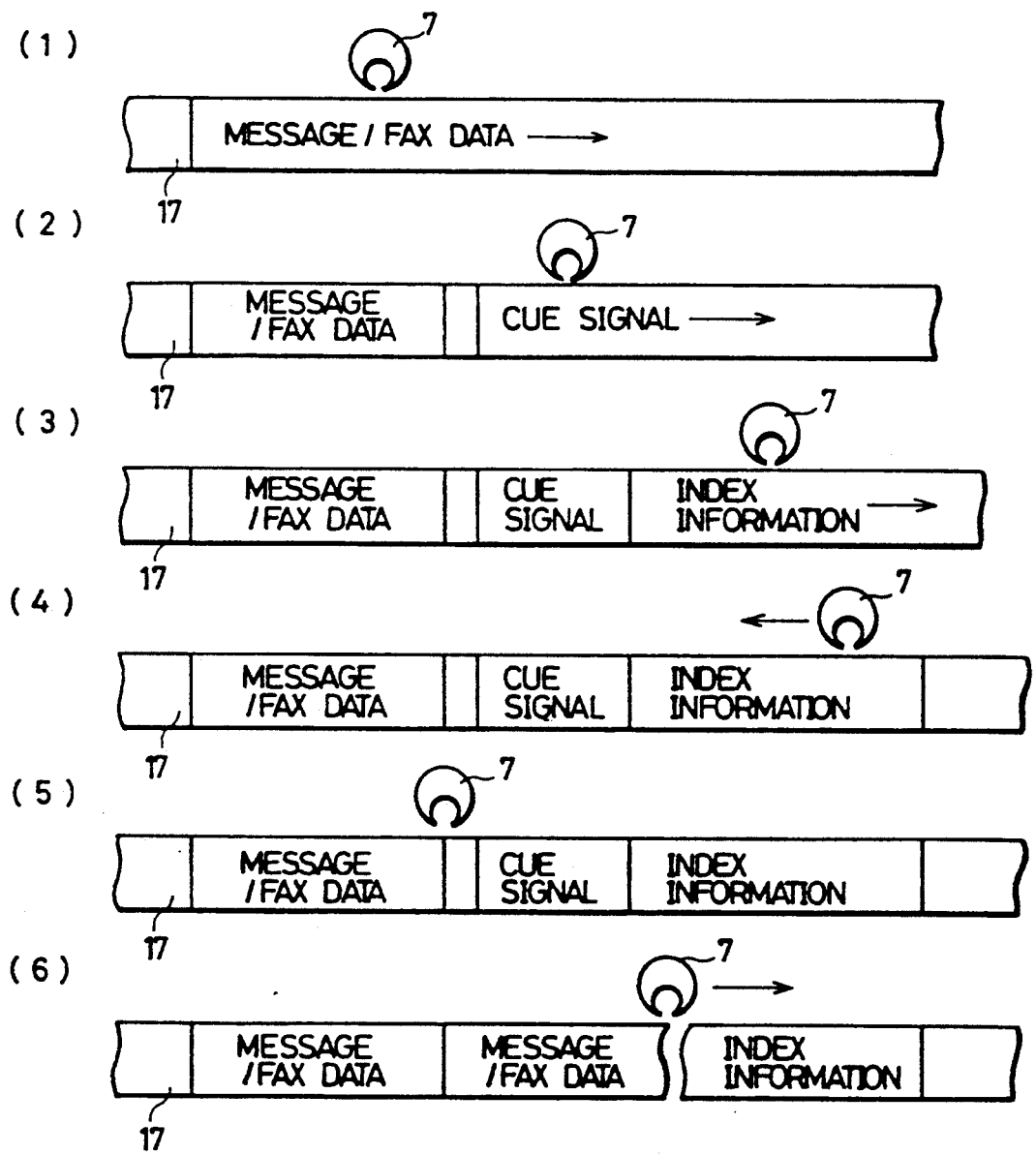
FIG. 3 is a diagram for describing the operation of facsimile apparatus 1 at the time of automatic response.

FIG. 2 is a flow chart for describing the operation of facsimile apparatus 1 at the time of automatic answering, and FIG. 3 is a diagram for describing the recorded state of data in magnetic tape 17. When a predetermined number of reception signals (ringing bursts) via telephone line 16 is detected at step a1, the program proceeds to step a2 where hook switch 3 is closed to commence automatic answering. A facsimile signal is monitored by modem 2 at step a3.

At step a4, determination is made whether a facsimile signal is detected by modem 2. If a facsimile signal is not detected, control proceeds to step a5, otherwise to step a7.

When a facsimile signal is not detected at step a4, i.e. in the case of receiving a voice signal (message), switch 6 is connected to terminal 6a at step a5. At step a6, the message transmitted from telephone line 16 is provided to magnetic head 7 via hook switch 3, voice communication circuit 4, and switch 6 to be recorded on magnetic tape 17, as shown in FIG. 3(1).

When a facsimile signal is detected at step a4, a detection signal is provided from modem 2 to facsimile transmission/reception controller 15a at step a7. This causes hook switch 3 to be open to commence facsimile reception at step a8. The facsimile data received by facsimile reception is provided to data controller 15b via facsimile transmission/reception controller 15a. Data controller 15b supplies facsimile data and a control signal to data recording/reproduction circuit 5 and tape recording/reproduction controller 15d, respectively.

At step a9, switch 6 is connected to terminal 6b by tape recording/reproduction controller 15d according to the control signal, and magnetic tape driving mechanism 8 is set to a recording mode. At step a10, the facsimile data is provided to magnetic head 7 via switch 6 to be recorded on magnetic tape 17, as shown in FIG. 3(1).

At step a11, a count value is stored in memory 15m in main control unit 15 that indicates the position where the message or facsimile data is recorded on magnetic tape 17. Index information is stored in memory 15m which is the control information indicating how many messages and facsimile data are recorded and where each message and facsimile data is recorded on magnetic tape 17. The index information is used for the head position detecting operation at the time of reproduction of a message or facsimile data.

After the recording of a message or facsimile data and storage of index information into memory 15m, the recording of a CUE signal to magnetic tape 17 is carried out at step a13. More specifically, data controller 15b supplies a control signal to data recording/reproduction circuit 5 and to tape recording/reproduction controller 15d. Tape recording/reproduction controller 15d switches switch 6 to the data recording/reproduction circuit side, i.e. to terminal 6b. If facsimile data was recorded at the prior operation, switch 6 receives a switching signal, but does not operate, since it is already connected to the data recording/reproduction circuit 5 side. Data recording/reproduction circuit 5 provides a CUE signal (a rectangular wave signal of 50 Hz) to record a CUE signal on magnetic tape 17, as shown in FIG. 3(2). A CUE signal is recorded for 2-3 seconds.

At step a14, the index information stored in memory 15m is recorded on magnetic tape 17. More specifically, data controller 15b reads out index information from memory 15m to provide the same to magnetic head 7 via data recording/reproduction circuit 5. This causes index information to be recorded on magnetic tape 17 by magnetic head 7, as shown in FIG. 3(3).

Upon the termination of index information recording, magnetic tape 17 is rewound to the last recorded position of the message or facsimile data at step a15. More specifically, data controller 15b rewinds magnetic tape 17 to the last recorded position, as shown in FIG. 3(4), according to a count value indicating the recorded position of the latest message or facsimile data according to the index information stored in memory 15m. After magnetic tape 17 is rewound to the last recorded position of the message or facsimile data, tape recording/reproduction circuit 5 ceases the travel of the magnetic tape to attain a standby state for recording the next message or facsimile data, as shown in FIG. 3(5).

Then, when a new message or facsimile data is received to commence recording to magnetic tape 17, the previously recorded CUE signal and index information are erased, as shown in FIG. 3(6), to record newly a CUE signal and index information after the recording of the new message or facsimile data, according to an operation similar to the above-described operations.

Figure 4:
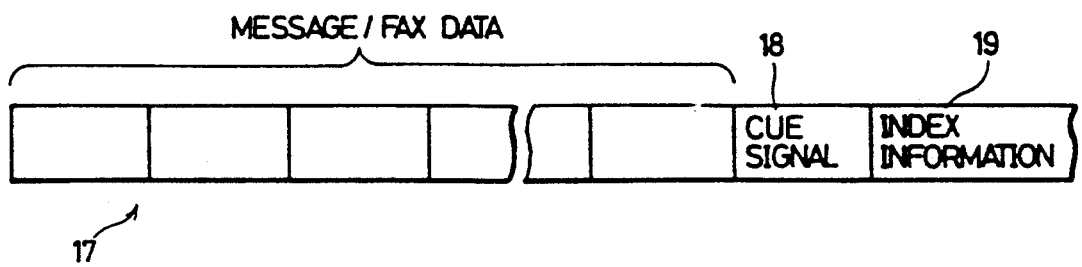
FIG. 4 is a diagram showing a recording format of a magnetic tape 17.

By repeating the operations shown in the flow chart of FIG. 2, magnetic tape 17 always has a message or facsimile data followed by a CUE signal and the current (latest) index information recorded, as shown in FIG. 4. The index information on magnetic tape 17 is the information stored in memory 15m in main control unit 15. The index information is used for head position detecting at the time of reproduction of a message or facsimile data.

The details of the index information region of the second embodiment will be explained hereinafter with reference to FIG. 5.

FIG. 5 shows the format of an index region 19. A synchronizing signal is recorded at the head position of index region 19, followed by sequential file information (file information 1, file information 2, file information 3, file information 4, etc.).

The synchronizing signal is a specific binary data for attaining synchronization. The file information comprises information indicating the distinction between an image signal or a voice signal, and a tape counter information indicating the start position of the received data.

A file information corresponding to each message/facsimile data is formed of 24 bits, as shown in the lower row of FIG. 5. The first bit is the identification information for identifying whether the recorded data is an image signal or a voice signal. The next seven bits are not used. The remaining bits from the ninth bit to the twenty-fourth bit indicate the tape counter information.

In the embodiment, the first bit of identification information is set to "0" in the case of image data, and to "1" in the case of voice data. The seven not-used bits are always set to "0". The tape counter information indicates a number within the range of 0 to 65536 which is converted into a binary code.

These data are recorded on magnetic tape 17 by a MFM record signal similar to the recording of an image signal.

Figure 6:
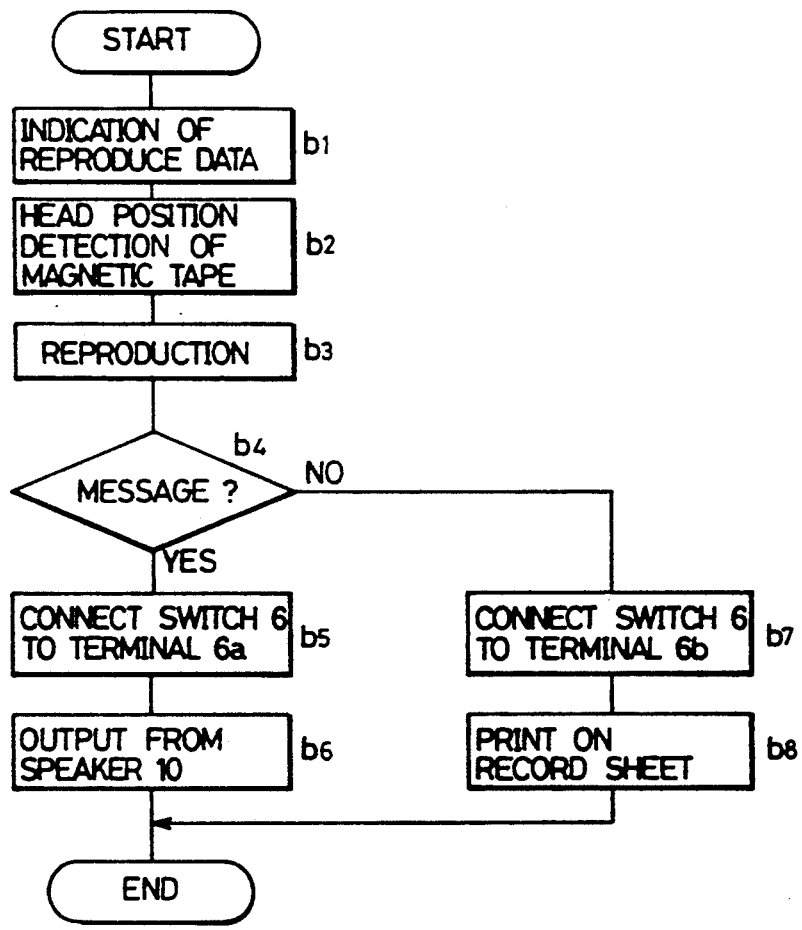
FIG. 6 is a flow chart for describing the reproduction operation of magnetic tape 17 in facsimile apparatus 1.

FIG. 6 is a flow chart for describing the reproduction operation of message or facsimile data from magnetic tape 17. At step b1, operation panel 12 is operated by an operator to indicate a message or facsimile data to be reproduced. More specifically, if the third message or facsimile data is to be reproduced, for example, the operator uses the operation panel 12 to establish the setting, whereby operation panel controller 15c detects the operation state of operation panel 12 to provide a detection signal to data controller 15b.

At step b2, the head position detection operation of magnetic tape 17 is carried out. More specifically, data controller 15b responds to the above-mentioned detection signal to provide a control signal to data recording/reproduction controller 15d. Tape recording/reproduction controller 15d controls magnetic tape driving mechanism 8 to detect the head position of the third message or facsimile data using the index information stored in memory 15m. This head position detecting operation is carried out according to the aforementioned count value.

After the head position of magnetic tape 17 is detected, the reproduction of magnetic tape 17 is carried out by magnetic tape driving mechanism 8 at step b3. At step b4, a determination is made whether the reproduced data is a message or not by the index information. If the reproduced data is a message, switch 6 is connected to terminal 6a at step b5 to provide the reproduced signal to voice communication circuit 4. At step b6, the reproduced message (voice signal) is provided from speaker 10.

If the reproduced data is not a message at step b4, i.e. if the reproduced data is facsimile data, control proceeds to step b7 where switch 6 is connected to terminal 6b. The reproduced data (facsimile data) is provided to printer 14 via data recording/reproduction circuit 5, data controller 15b, record sheet printing controller 15f. At step b8, the reproduced facsimile data is printed on a record sheet.

Figure 7:
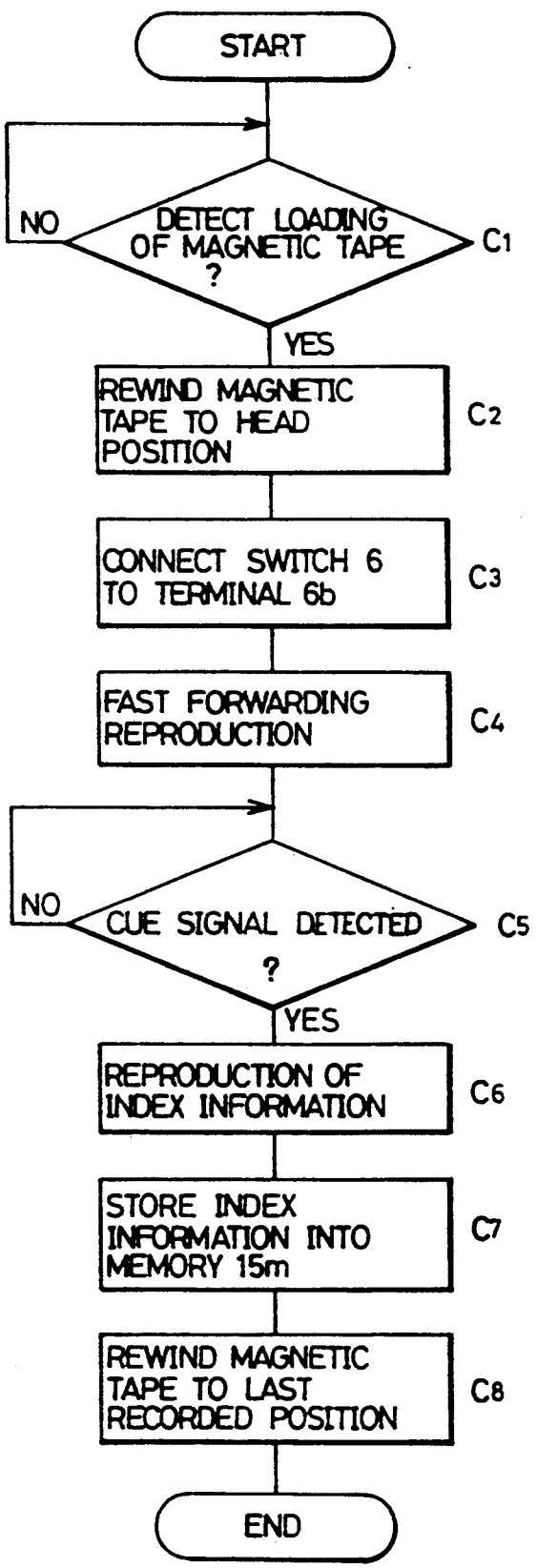
FIG. 7 is a flow chart for describing the operation when a magnetic tape is loaded in facsimile apparatus 1.
Figure 8:
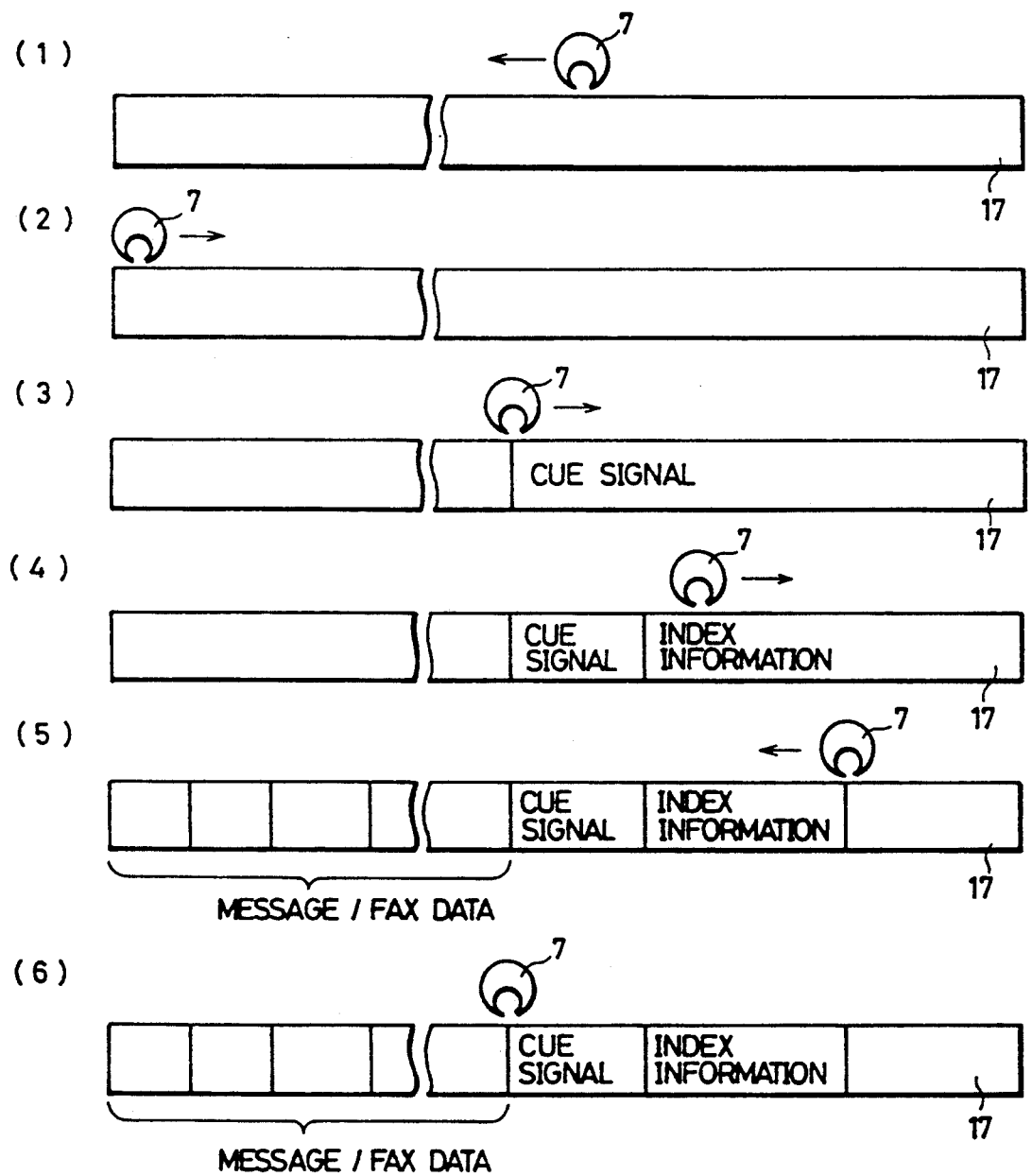
FIG. 8 is a diagram for describing the operation when a magnetic tape is loaded in facsimile apparatus 1.

FIG. 7 is a flow chart for describing the operation of loading magnetic tape 17 having a message or facsimile data, and index information recorded thereupon in facsimile apparatus 1. FIG. 8 is a diagram showing the position relationship between magnetic tape 17 and magnetic head 7. At step C1, detection is made whether magnetic tape 17 is loaded in a facsimile apparatus 1. If magnetic tape 17 is loaded, a detection signal is provided from data controller 15b to tape recording/reproduction controller 15d. At step c2, magnetic tape 17 is rewound to the head position, as shown in FIG. 8(1).

After the loaded magnetic tape 17 is rewound to the head position, tape recording/reproduction controller 15d controls switch 6 to be connected to terminal 6b at step c3. At step c4, magnetic head 7 is positioned near the recorded surface of magnetic tape 17 to carry out fast forwarding, thereby to detect a CUE signal recorded on magnetic tape 17 (fast forwarding reproduction).

At step c5, determination is made whether a CUE signal is detected or not, as shown in FIG. 8(3). When a CUE signal is detected, data controller 15b responds to the detected CUE signal to provide a detection signal to tape recording/reproduction controller 15d at step c6. Tape recording/reproduction controller 15d establishes a reproduction state for magnetic tape 17 to reproduce index information, as shown in FIG. 8(4).

At step c7, the reproduced index information is provided to data controller 15b via data recording/reproduction circuit 5. Data controller 15b stores the index information read out from magnetic tape 17 into memory 15m to restore the stored contents of the newly loaded magnetic tape 17 to the state just prior to being unloaded. Upon completion of reading the index information, data controller 15b provides a completion signal to tape recording/reproduction controller 15d, whereby tape recording/reproduction controller 15d rewinds magnetic tape 17 towards the last recorded position (FIG. 8(5)). When magnetic tape 17 is rewound to the last recorded position, tape recording/reproduction controller 15d ceases the travel of magnetic tape 17 to establish a recording standby state for a message or facsimile data, as shown in FIG. 8(6).

If index information is not recorded on a magnetic tape such as in the case where the magnetic tape is a new one, a CUE signal will not be detected at step c5 of FIG. 7 so that magnetic tape 17 will be fast forwarded until the terminal position of the tape. At this point, tape recording/reproduction controller 15d stops the travel of magnetic tape 17 and provides a stop signal to data controller 15b. Data controller 15b responds to this stop signal and initializes the index information in memory 15m to set the number of recorded messages or facsimile data to 0.

Thus, according to the present embodiment, magnetic tape 17 has index information indicating the type, number, and position of data recorded on magnetic tape 17 following a received message or facsimile data, so that the stored contents in memory 15m, even if erroneously unloaded, can be restored by reproducing the index information on magnetic tape 17.

When a new message or facsimile data is to be recorded, the previous index information is erased and a new index information is recorded after the newly recorded message or facsimile data. A plurality of index information will not be recorded on magnetic tape 17 to prevent erroneous operation in reading out index information from magnetic tape 17.

The loading of magnetic tape 17 with prerecorded message or facsimile data into facsimile apparatus 1 causes the index information on that magnetic tape 17 to be read out and stored in memory 15m, whereby head position detection and reproduction of a message or facsimile data on the loaded magnetic tape 17 can be carried out at once. Magnetic tape 17 can be utilized as a storage file of messages and facsimile data to enlarge the range of usage of facsimile apparatus 1.

(2) Second Embodiment

A second embodiment according to the present invention will be explained hereinafter. The structure of the device of the second embodiment is similar to that of the first embodiment, with the difference only in the record format of data. The record format of data of the second embodiment is shown in FIG. 9.

The operation of the second embodiment is similar to that of the first embodiment except for the following points. The second embodiment has the advantage of reading data more speedily when magnetic tape 17 is loaded in the transmission device since the index information region is provided at the head of magnetic tape 17. Furthermore, it is not required to provide a CUE signal region for fast forwarding as in the first embodiment. As a result, it is possible to use the device more efficiently.

Figure 9:
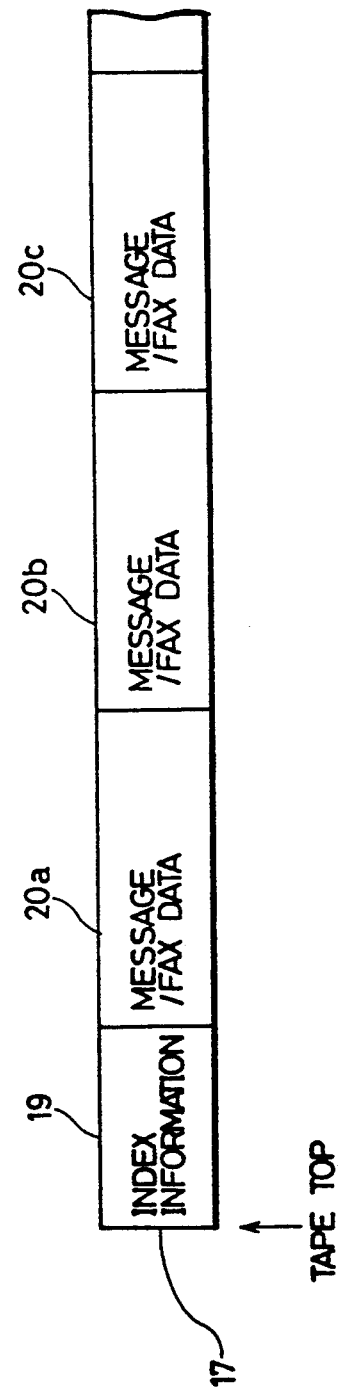
FIG. 9 is a diagram showing another embodiment of a recording format of a magnetic tape.

In the second embodiment data are recorded in the format as shown in FIG. 9. The operation of unloading magnetic tape 17 from the main body of the device is carried out as follows.

In carrying out the operation of unloading magnetic tape 17 from the main body of the facsimile apparatus with operation panel 12, tape recording/reproduction controller 15d temporarily suspends the tape eject operation according to the operation signal provided from operation panel 12. Controller 15d provides a switching control signal to switch 6, whereby switch 6 is connected to the side of terminal 6b.

Controller 15d provides a control signal indicating rewinding of the tape to tape driving mechanism 8 according to the operation signal from operation panel 12.

Tape driving mechanism 8 rewinds magnetic tape 17 to the head portion according to the control signal. Tape driving mechanism 8 provides a signal indicating the completion of rewinding to controller 15d when magnetic tape 17 is rewound to the head position.

Controller 15d reads the index information stored in memory 15m in response to the rewind completion signal. The index information is provided to control unit 15b, data recording/reproduction circuit 5, switch 6 after a synchronizing signal, whereby the same is provided to magnetic head 7. Controller 15d controls tape driving mechanism 8 for carrying out recording index information according to the rewind complete signal.

Thus, the index information read out from memory 15m is recorded on index region 19 of magnetic tape 17, as shown in FIG. 5. At this time, the stored data in memory 15m is cleared.

Upon recording the index information, an eject operation is carried out for unloading magnetic tape 17 from facsimile apparatus 1.

The unloaded magnetic tape 17 has the index information of the image data and the voice data recorded in index region 19 on magnetic tape 17.

The operation of loading again to facsimile apparatus 1 magnetic tape 17 which was unloaded in the above manner will be described hereinafter.

The loading of magnetic tape 17 into facsimile apparatus 1 causes tape driving mechanism 8 to provide to controller 15d a signal indicating that magnetic tape 17 has been loaded. Controller 15d provides a control signal to indicate rewinding of the tape to tape driving mechanism 8 according to the signal indicating loading.

Tape driving mechanism 8 rewinds magnetic tape 17 to the head position according to the control signal. Tape driving mechanism 8 provides a signal indicating the completion of rewinding to controller 15d when magnetic tape 17 is rewound to the head position.

Controller 15d is responsive to the signal indicating that a tape has been loaded to provide a switching control signal to switch 6, whereby switch 6 is connected to terminal 6b.

Then, controller 15d provides a control signal indicating reproduction to tape driving mechanism 8. Tape driving mechanism 8 is responsive to this control signal to initiate reproduction operation from the head position of magnetic tape 17.

First, a synchronizing signal is read by magnetic head 7 from index region 19 which is positioned at the begining of the tape. This read out index information is provided to data controller 15b via switch 6 and data recording/reproduction circuit 5. The index information is then stored in memory 15m.

The reproduction of image data or voice data recorded on magnetic tape 17 is similar to that for the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication device for receiving voice signals and image signals via a telephone line, including a detachable recording medium that records the voice signals/image signals sequentially, said communication device comprising:

means for recording said received voice signals/image signals on said detachable recording medium, means for sequentially reproducing said recorded voice signals/image signals, means for recording on said detachable recording medium, index information including a voice signal/image signal indicator and a recorded position on said detachable recording medium, and means for reading and storing the index information in a memory of said communication device when said detachable recording medium is loaded into said communication device and controlling recording to and reproduction from said detachable recording medium according to the index information;

said detachable recording medium including a voice signal/image signal record region at a top portion, followed by an index information region for the index information.

2. The communication device of claim 1, wherein said detachable recording medium includes a region for the index information at a top portion, followed by a voice signal/image signal record region.

3. The communication device of claim 1, wherein said communication device constitutes a facsimile apparatus incorporating a telephone set with an answering machine.

4. The communication device of claim 1, further comprising:

control means for controlling said detachable recording medium such that when said detachable recording medium is unloaded from said communication device, the index information is stored in the memory before said detachable recording medium is unloaded.

5. A method of controlling a communication device for receiving voice signals and image signals via a telephone line, said communication device including a detachable recording medium for sequentially recording data, said method comprising the steps of:

receiving a voice signal/image signal, recording said received voice signal/image signal on the detachable recording medium, recording on the detachable recording medium, index information including a voice signal/image signal indicator and a recording position, storing the index information in a memory of the communication device when the detachable recording medium is loaded into the communication device, controlling recording to and reproduction from the detachable recording medium according to the index information, erasing previously recorded index information and recording a new voice signal/image signal following the previously recorded voice signal/image signal, when the new voice signal/image signal is to be recorded on the detachable recording medium, and recording new index information after the newly recorded voice signal/image signal.

6. The control method of claim 5, further comprising the step of restoring the index formation when the detachable recording medium is loaded into the communication device.

7. The control method of claim 5, further comprising the steps of:

recording the index information on the detachable recording medium before the detachable recording recording medium is unloaded from the communication device, and unloading the detachable recording medium from the communication device after the index information is stored in the memory.

8. A communication device for receiving voice/image signals from a telephone line, comprising:
recording means for recording a first voice/image signal on a detachable recording medium;
memory means for storing index information, including a message number and a message position, for the first voice/image signal;
control information recording means for recording the index information for the first voice/image signal on the detachable recording medium;
erasing/rerecording means for recording a second voice/image signal on the detachable recording medium by positioning a magnetic head of said recording means immediately after the first voice/image signal, erasing the index information for the first voice/image signal, writing the second voice/image signal after the first voice/image signal, and rewriting updated index information, including index information for both the first and second voice/image signals, after the second voice/image signal; and
index information updating means for writing the updated index information in said memory means.

9. The communication device of claim 8, wherein said detachable recording medium includes a voice signal/image signal record region at a top portion, followed by an index information region for the index information.

10. The communication device of claim 8, wherein said detachable recording medium includes a region for the index information at a top portion, followed by a voice signal/image signal record region.

11. The communication device of claim 8, wherein said communication device constitutes a facsimile apparatus incorporating a telephone set with an answering machine.

12. The communication device of claim 11, further comprising:

control means for controlling said detachable recording medium such that when said detachable recording medium is unloaded from said communication device, the index information is stored in said memory means before said detachable recording medium is unloaded.

13. A method of controlling a communication device for receiving voice/image signals from a telephone line, comprising the steps of:
recording a first voice/image signal on a detachable recording medium;
storing index information, including a message number and a message position, for the first voice/image signal;
recording the index information for the first voice/image signal on the detachable recording medium;
recording a second voice/image signal on the detachable recording medium by positioning a magnetic head immediately after the first voice/image signal, erasing the index information for the first voice/image signal, writing the second voice/image signal after the first voice/image signal, and rewriting updated index information, including index information for both the first and second voice/image signals after the second voice/image signal; and
storing the updated index information.

14. The control method of claim 13, further comprising the step of restoring the updated index information when the detachable recording medium is loaded into the communication device.

15. The control medium of claim 13, further comprising the steps of:
recording the updated index information on the detachable recording medium before the detachable recording medium is unloaded from the communication device, and
unloading the detachable recording medium from the communication device after the updated index information is stored in the memory.

* * * * *